(12) United States Patent
Carmichael et al.

(10) Patent No.: US 10,661,936 B2
(45) Date of Patent: May 26, 2020

(54) LABELLING GROUP AND METHOD FOR APPLYING A PLURALITY OF LABELS ONTO RESPECTIVE ARTICLES

(71) Applicant: Sidel Participations, Octeville-sur-mer (FR)

(72) Inventors: James Carmichael, Parma (IT); Mattia Giuliani, Parma (IT)

(73) Assignee: SIDEL PARTICIPATIONS, Octeville-sur-mer (FR)

( * ) Notice: Subject to any disclaimer, the term of this patent is extended or adjusted under 35 U.S.C. 154(b) by 402 days.

(21) Appl. No.: 15/635,151

(22) Filed: Jun. 27, 2017

(65) Prior Publication Data
US 2017/0369197 A1 Dec. 28, 2017

(30) Foreign Application Priority Data
Jun. 27, 2016 (EP) .................. 16305772

(51) Int. Cl.
*B65C 9/18* (2006.01)
*B32B 38/18* (2006.01)

(52) U.S. Cl.
CPC ........ *B65C 9/1819* (2013.01); *B32B 38/1858* (2013.01); *B65C 2009/1834* (2013.01); *B65C 2009/1861* (2013.01); *Y10T 156/1768* (2015.01); *Y10T 156/1771* (2015.01)

(58) Field of Classification Search
CPC ....... B65C 9/18; B65C 9/1803; B65C 9/1815; B65C 9/1819; B65C 2009/1838; B65C 2009/1861; B32B 38/1858; Y10T 156/1768; Y10T 156/1771

USPC .................................................. 156/DIG. 33
See application file for complete search history.

(56) References Cited

U.S. PATENT DOCUMENTS 5,380,381 A * 1/1995 Otruba .................. B65C 9/1819
156/265
5,413,651 A * 5/1995 Otruba ..................... B26D 5/20
156/351
6,883,576 B1 4/2005 Rello et al.

FOREIGN PATENT DOCUMENTS

EP 0 641 717 A2 3/1995
WO WO 93/21071 A1 10/1993

OTHER PUBLICATIONS

Extended European Search Report dated Dec. 15, 2016, 4 pages.

* cited by examiner

*Primary Examiner* — Carson Gross

(57) ABSTRACT

There is disclosed a labelling group for advancing a series of labels to be applied onto relative articles. In one implementation, the labelling group may include a first drum adapted to convey a strip of labels along a first path and towards a transfer station; a cutting mechanism adapted to cut a sequence of single labels from the strip; a second drum fed by first drum with cut single labels at the transfer station and adapted to convey simultaneously a required number of cut single labels along a second path. The first drum may move at a first tangential speed at the transfer station, and the second drum may move at a second tangential speed at the transfer station, where the first tangential speed is different from the second tangential speed and is adjusted on the basis of required number of cut labels to be simultaneously conveyed on second drum.

18 Claims, 6 Drawing Sheets

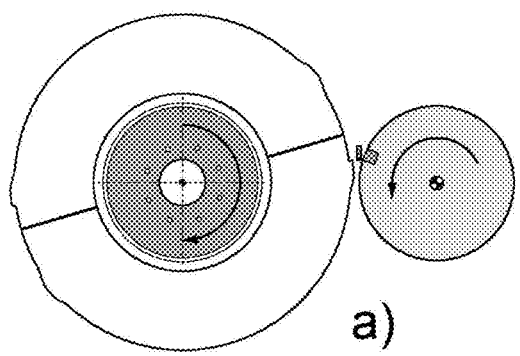
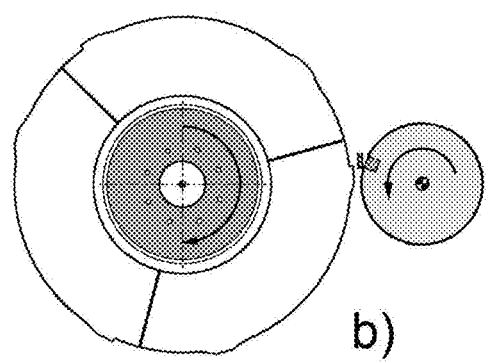
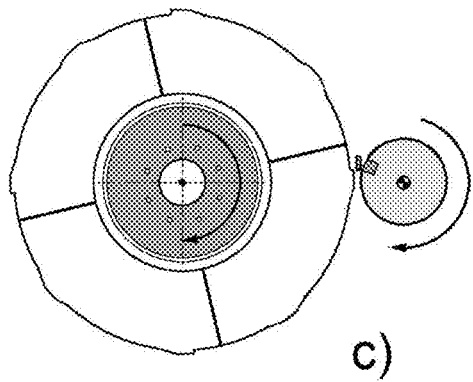
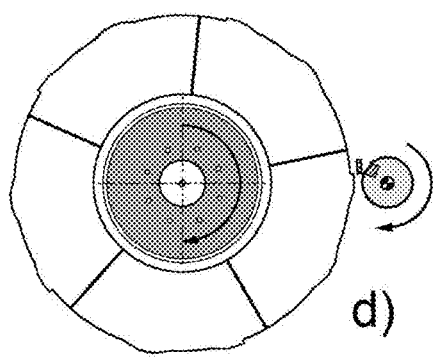
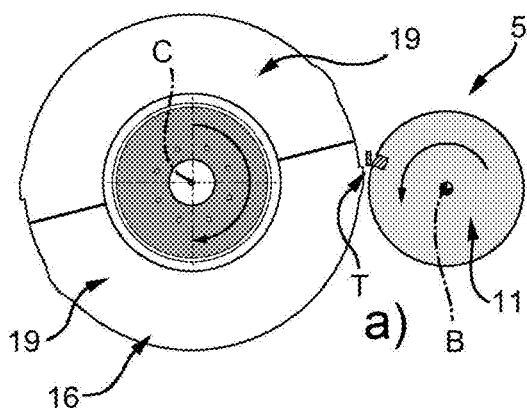
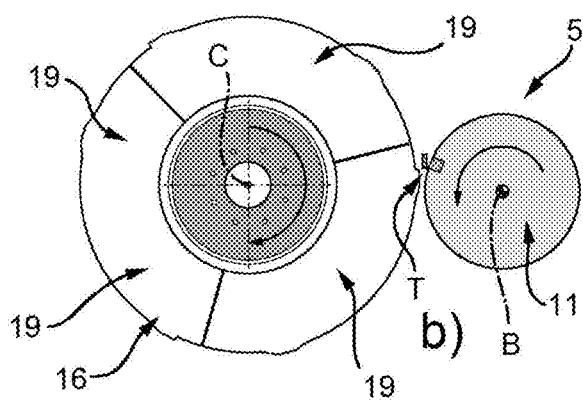
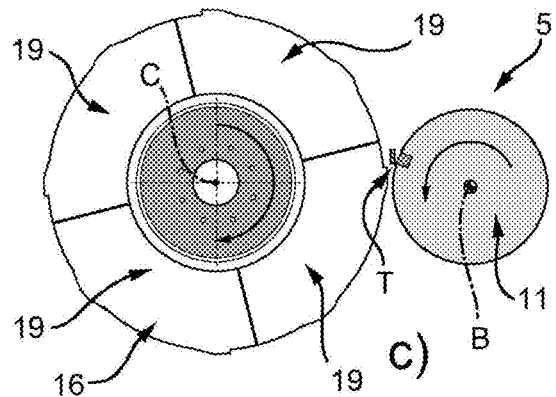
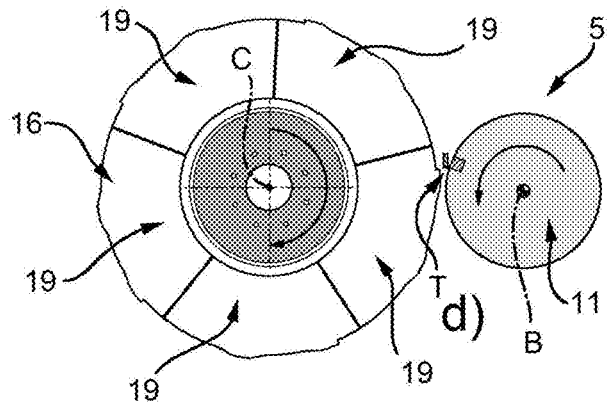
FIG. 1
FIG. 2

LABELLING GROUP AND METHOD FOR APPLYING A PLURALITY OF LABELS ONTO RESPECTIVE ARTICLES

This application claims priority to European Patent Application EP16305772.2, filed on Jun. 27, 2016, the contents which are incorporated herein by reference in their entirety.

TECHNICAL FIELD

The present disclosure relates to a labelling group and to a method for applying a plurality of labels onto respective articles.

BACKGROUND

Labelling machines generally have a carousel for conveying articles to be labelled, e.g. containers filled with a pourable food product, and at least one labelling group for applying labels to relative containers advanced by the conveyor.

The above-indicated labelling machines are generally referred to as roll-fed labelling machines.

For example, the labelling group in a roll-fed labelling machine may include:
- a shaft for rotatably supporting a reel off which a strip of labels is unwound and fed along a feed path;
- a plurality of unwinding rollers for unwinding a backing web along a rectilinear feed path;
- a motorized roll, which unwinds the strip of labels and determines the speed thereof;
- a cutter drum, which rotates about a first axis and is fed with the strip and outputs a sequence of cut single labels;
- a transfer drum, which rotates about a second axis and receives the cut single labels from the cutter drum at a transfer station and advances these cut labels; and
- a gluing drum for applying glue onto the each previously cut label, while the latter is advanced by the transfer drum.

In particular, the cutter drum generally drives in rotation a rotating blade, and the labelling group may include a stationary blade, which is fixed with respect to the rotating drive.

In this way, as it is advanced by the cutter drum, the strip of labels may be gripped, at a predetermined angular position of the cutter drum, between the rotating blade and the stationary blade and may be accordingly cut in the sequence of single labels.

Furthermore, the cut labels may be retained on the transfer drum and on the cutter drum by means of the vacuum applied thereon.

In particular, after having been cut, two thirds of each label may rest on the transfer drum and one third may rest on the cutter drum.

Thus, each label may be driven, after having been cut, by the transfer drum and accelerated from the speed determined by the motorized roll to the speed determined by the transfer drum.

The transfer drum may include a number of divisions, i.e. of angularly spaced sectors along which the vacuum is applied. The number of divisions may equal the number of labels which can be conveyed simultaneously by the transfer drum.

For example, a transfer drum with three divisions may convey three labels for each rotation while a transfer drum with two divisions may convey two labels for each rotation.

Thus, generally, the higher the number of the divisions, the lower the maximum length of the labels that can be transferred and the higher the rate at which labels can be applied onto respective articles.

In order to change the number of the divisions of the transfer drum, a different number of sectors with different angular lengths may be mounted thereon.

The transfer drum and the cutter drum may be rotated about respective first axis and second axis with respective first angular speed and second angular speed.

Still more precisely, the trajectories of the transfer drum about the first axis and the cutter drum about the second axis may have a common tangent at the transfer station.

The first and second angular speeds may be chosen in such a way that the tangential speed of the transfer drum is equal to the tangential speed of the cutter drum at the transfer station.

In this way, the single cut labels may undergo substantially constant acceleration from the speed of the strip to the tangential speed of the transfer drum, when they are transferred from the vacuum drum to the cutter drum at the transfer station.

This transfer modality is generally termed homokinetic transfer.

One advantage of homokinetic transfer may be that the risk that labels corrugate during the transfer is substantially reduced. This is because the single cut labels undergo a substantially constant acceleration, as they are transferred form the cutter drum to the transfer drum.

Finally, the labels which have been cut and covered with glue may be transferred to and applied onto the relative containers, which generally travel at a given rate corresponding to the output rate of the labelling machine.

However, the above-mentioned machines and methods may leave room for improvement. It may be desired to use transfer drums with different number of divisions, e.g. to process labels of different length and/or to apply the labels at different speeds.

In the above-mentioned machines and methods, in order to preserve the homokinetic transfer, this may be possible only by changing the diameter of the transfer drum. This is because the cutter drum conveys one label only for each revolution and the homokinetic transfer may, therefore, be achieved only if the circumference of the cutter drum is equal to the length of each division of the transfer drum.

Accordingly, every time that it is required to vary the length or the speed of the labels to be transferred, it may be necessary to remove the existing transfer drum from the labelling group and to install a new transfer drum with a different diameter on the same labelling group, as shown in FIG. 1.

This operation is generally complex and time-consuming and requires the availability of a plurality of transfer drums with different diameters.

SUMMARY

It may be desired to use the same cutter drum with transfer drums, which have been provided with different number of divisions, in a simple, low time-consuming and economic way.

Embodiments of the present disclosure may provide a labeling group which meets one or more of the above-identified requirements.

Embodiments of the present disclosure are hereinafter disclosed by way of non-limitative example and with reference to the accompanying drawings.

FIG. 1 is a schematic view of different configurations of a labelling group as generally known in the art.

FIG. 2 is a schematic view of different configurations of a labelling group according to certain embodiments of the present disclosure.

Figure 4:
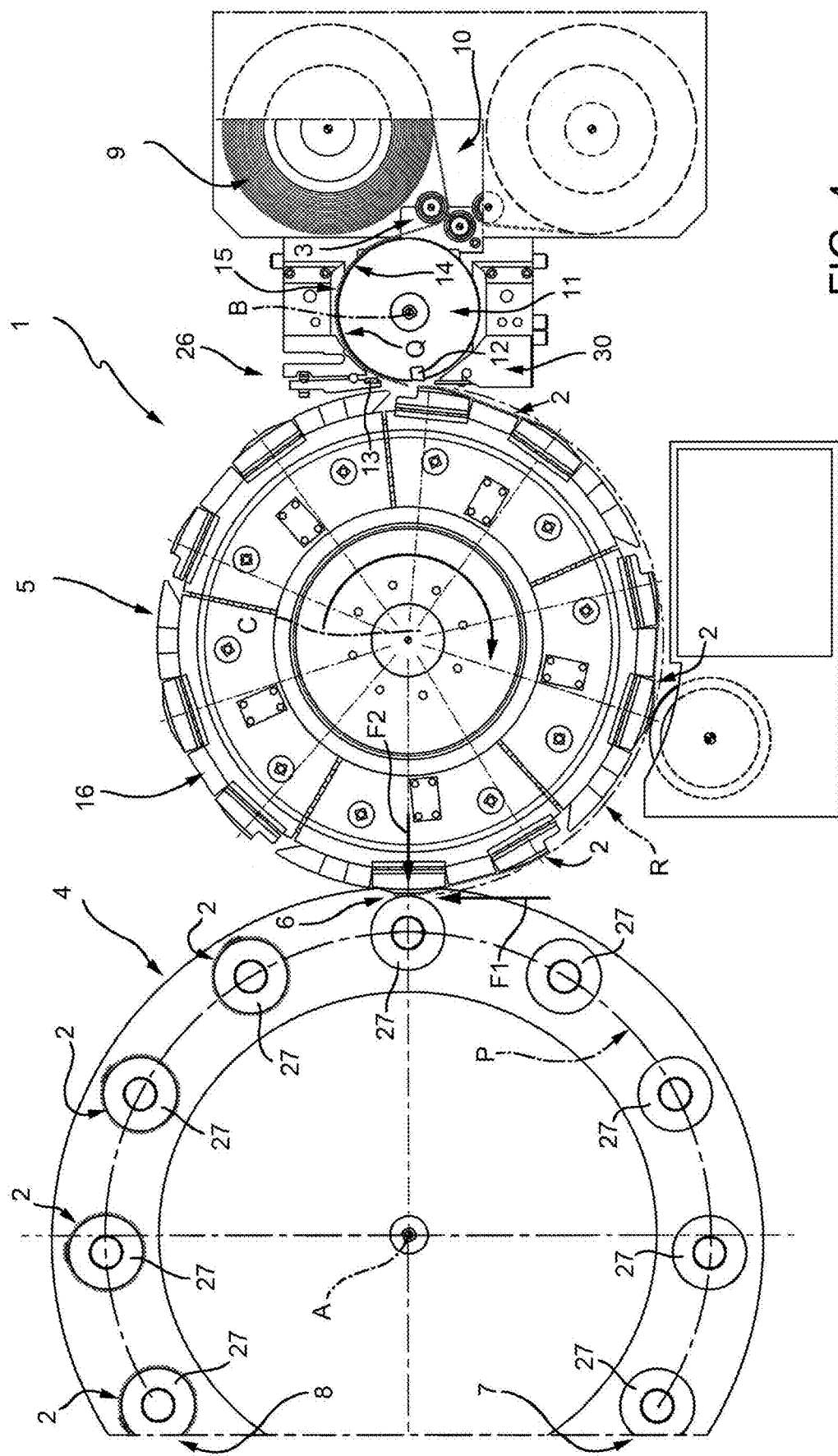
FIG. 4 is a top view of the labelling machine of FIG. 3.
Figure 5:
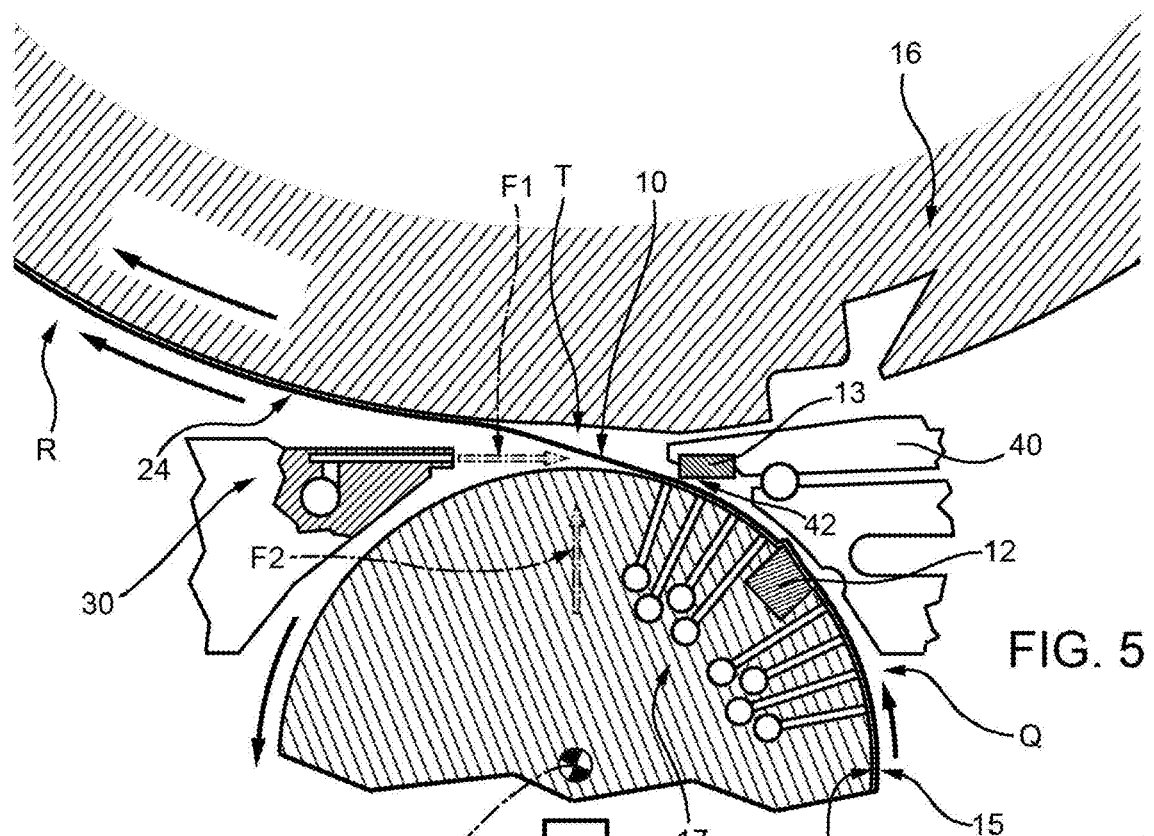
FIGS. 5 to 9 show, in a magnified scale, subsequent respective steps of the operation of the labelling group of FIGS. 2 to 4.
Figure 6:
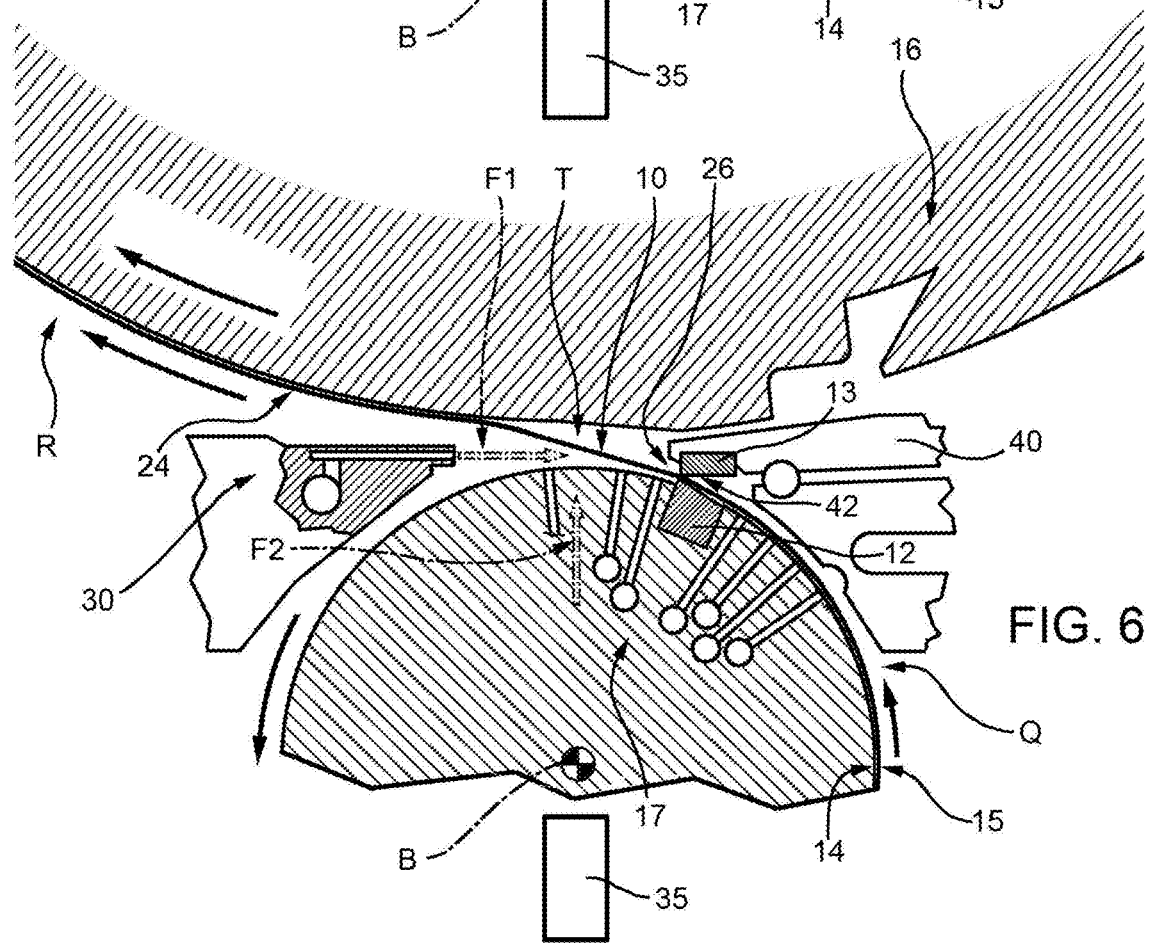
Figure 7:
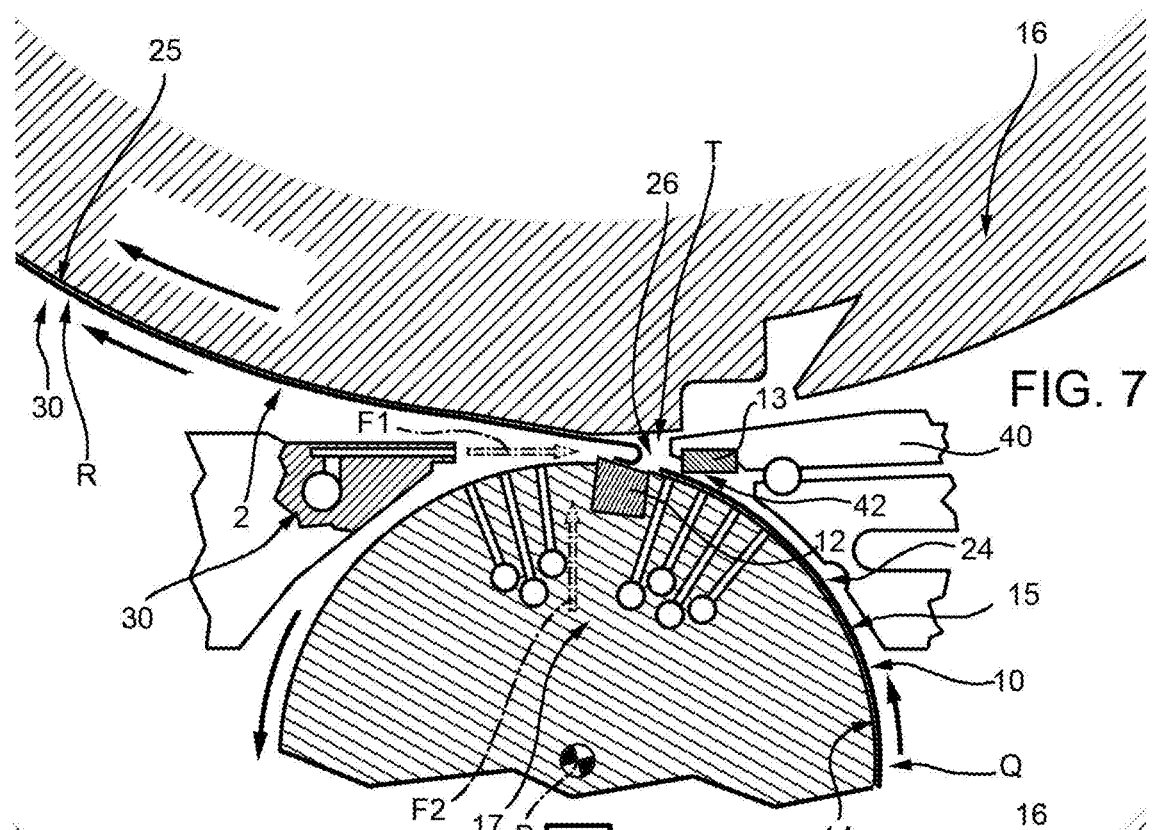
Figure 8:
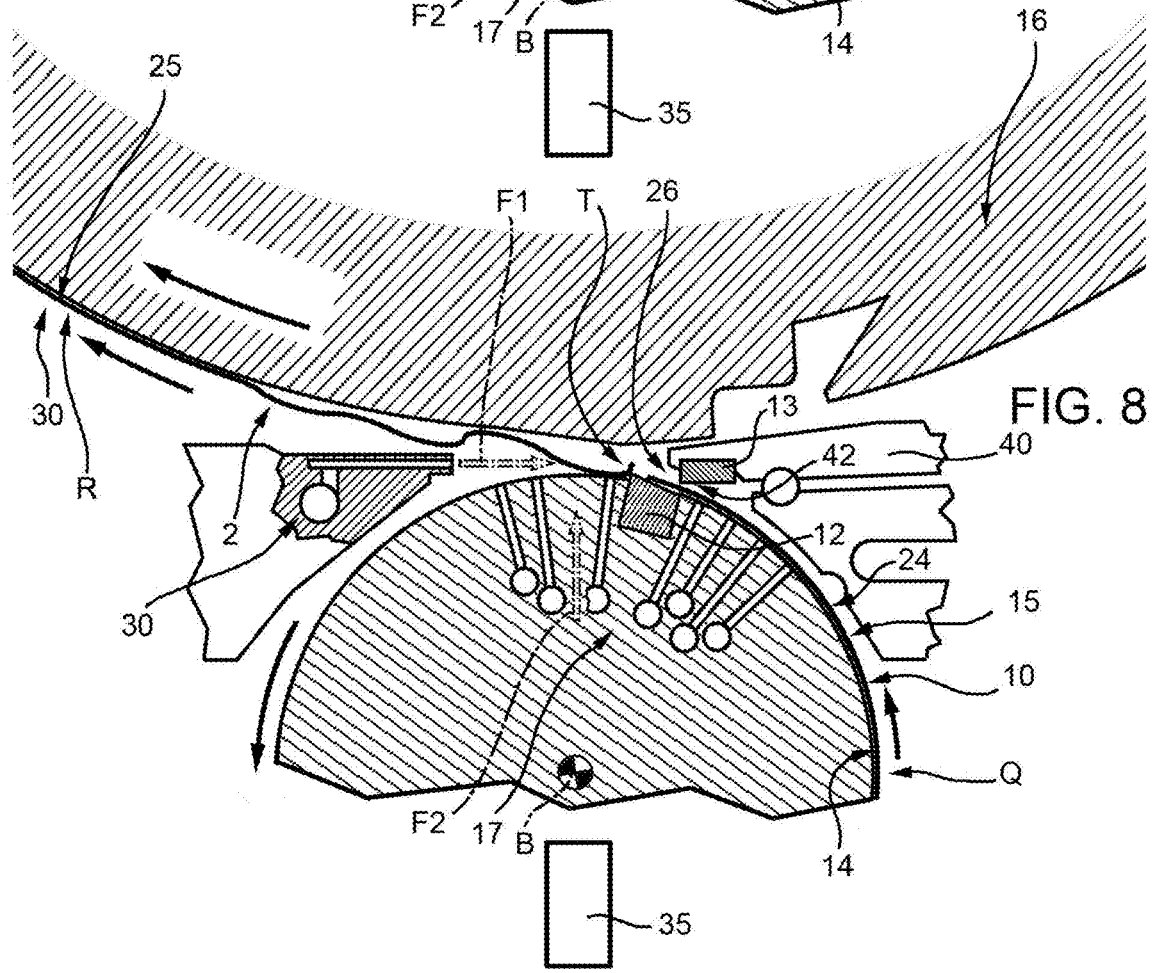

Number 1 in FIG. 4 indicates as a whole a labelling machine for applying labels 2 to respective articles, containers 27 for pourable food product in the embodiment shown.

More precisely, labelling machine 1 may comprise:
- a carousel 4 which may rotate about an axis A, which is vertical in the embodiment shown;
- a plurality of labelling groups 5, which are two in the embodiment shown, which may apply, in use, a relative glued label 2 onto containers 27 conveyed by carousel 4 at respective affixing stations 6.

In detail, carousel 4 may receive containers 27 to be labelled at an inlet station 7, may convey containers 27 along an arc-shaped path P having centre on axis A, and may output labelled containers 27 at an output station 8.

Labelling groups 5 may be angularly spaced relative to axis A.

Being understood that all labelling groups 5 are identical, only one labelling group 5 will be described hereinafter.

Labelling group 5 may comprise (as depicted in FIGS. 3 to 8):
- a shaft for rotatably supporting a reel 9 off which a strip 10 of labels 2 may be unwound and fed along a feed path O towards relative affixing station 6;
- a plurality of not-shown unwinding rollers for unwinding the strip 10 of labels along rectilinear feed path P;
- a motorized roll 3, which may advance strip 10 at a speed V3;
- a cutter drum 11, which may be rotatable about an axis B and may comprise, at its outer periphery, one rotary blade 12 adapted to cooperate with a first side 14 of strip 10;
- a cutter 26 may be provided with a stationary blade 13, which may be adapted to cooperate with a second side 15, opposite to first side 14, to cut labels 2 from strip 10 along a path Q;
- a transfer drum 16, which may be fed by cutter drum 11 at a transfer station T with a sequence of cut labels 2 and may rotate about an axis C to convey, one after the other, each cut labels 2 along a path R; and
- a gluing roll which may be covered with glue and apply glue onto each cut label 2 travelling along path R.

Axes A, B and C may be, in the embodiment shown, parallel to one another and vertical.

Paths Q, R may be arch-shaped and centred on axes B, C, respectively.

In detail, cutter drum 11 may comprise a suction vacuum system 17 (only schematically shown in FIGS. 5 to 8), which may be operated to exert a negative pressure, i.e. a suction action, on strips 10 and cut labels 2, so as to retain it on cutter drum 11.

More precisely, the suction action may be exerted along path Q, so as to convey strip 10 of labels 2 along path Q, and may be released at transfer station T to allow cut labels 2 to be transferred to transfer drum 16.

Transfer drum 16 may comprise a suction vacuum system 18 (only schematically shown in FIG. 9), which may be operated to exert a negative pressure, i.e. a suction action, on cut labels 2, so as to retain them on transfer drum 16.

Transfer drum 16 may comprise a plurality of divisions 19, which may correspond to the number of labels 2 that transfer drum 16 can simultaneously convey along path Q.

In general, the higher the number of divisions, the lower the length of labels 2 that are simultaneously transferred by transfer drum 16.

Figure 3:
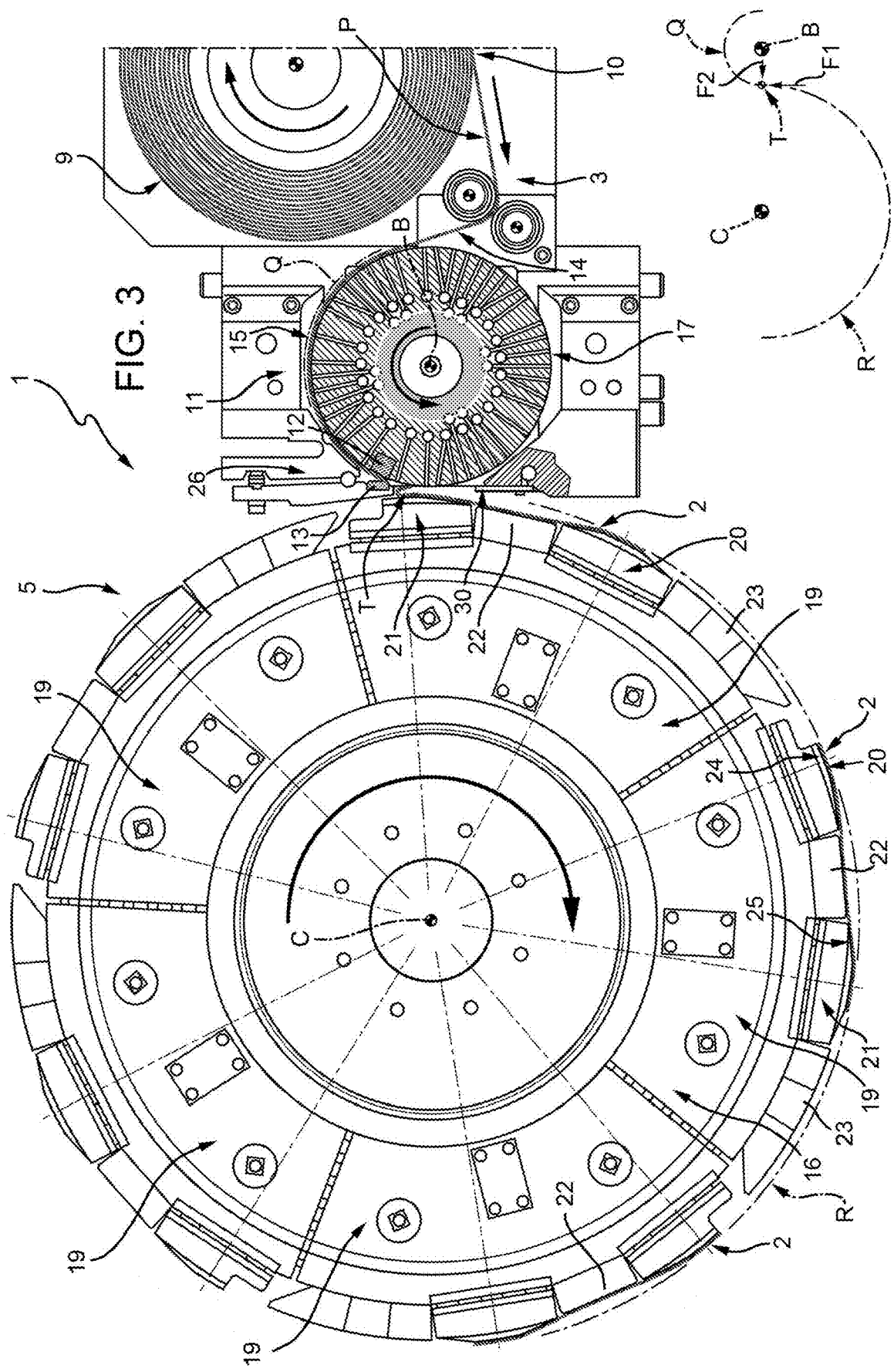
FIG. 3 is a top view of a labelling machine comprising the labelling group of FIG. 2, with parts removed for clarity.

With reference to FIG. 3, transfer drum 16 may comprise, for each division 19, a pair of angularly offset front pad 20 and back pad 21, an inter-pad segment 22 which may extend between pads 20 and 21, and a sliding segment 23 which may be arranged upstream of pad 20 proceeding according to the advancing direction of transfer drum 16 about axis C.

The number of division of transfer drum 16 may be changed by varying the number of pads 20, 21 and segments 22, 23.

Vacuum system 18 may exert action at pads 20, 21 and inter-pad segment 22 and may not exert at sliding segment 23.

The outer surface of cutter drum 11 and transfer drum 16 may move at transfer station T, respectively, with tangential speeds V1 and V2.

In the embodiment shown, tangential speeds V1, V2 may substantially equal the product of the radius and the rotational speed of cutter drum 11 and transfer drum 16, respectively, about respective axes B, C.

When each label 2 is cut by the interaction between rotary blade 12 and stationary blade 13, a front portion 25 of each label 2 may rest on transfer drum 16 and a rear portion 24 of each label 2 may rest on cutter drum 11.

In the embodiment shown, front portion 25 may equal two thirds of the length of label 2 while rear portion 24 may equal the remaining one third of the length of label 2.

Because the relative front portion 25 rests on transfer drum 16, each label 2 may be accelerated from speed V3 to speed V1 when it is cut from the remaining part of strip 10.

In some embodiments, tangential speed V1 may be different from tangential speed V2 and may be chosen on the basis of the number of single cut labels 2 simultaneously conveyed on transfer drum 16, i.e. on the basis of the number of divisions 19.

In other words, in some embodiments, the transfer of label 2 from cutter drum 11 and transfer drum 16 is not homokinetic.

In this way, it may no longer be necessary to change the whole cutter drum 11 when the number of divisions 19 changes, but it may be enough to correspondingly adjust speed V1 of cutter drum 11.

In some embodiments, then, cutter drums 11 of the same diameter may be used for transferring cut and single labels 2 to transfer drum 16.

In embodiments in which the transfer is not homokinetic, the length of the outer circumference of cutter drum 11 may be different from the length of the arc of circumference of each division 19.

In one embodiment, tangential speed V1 may be greater than tangential speed V2. This condition may be referred to as "overspeed transfer".

In this embodiment, during transfer from cutter drum 11 to transfer drum 16, rear portion 24 resting on cutter drum 11 may be accelerated towards front portion 25 resting on cutter drum 11.

In another embodiment, tangential speed V1 may be smaller than tangential speed V2. This condition may be referred to as "underspeed transfer".

In this embodiment, during transfer from cutter drum 11 to transfer drum 16, front portion 24 resting on cutter drum 11 may be accelerated away from rear portion 25 resting on cutter drum 11.

In both embodiments, the higher the tangential speed V1, the higher the number of divisions 19 on transfer drum 16.

Furthermore, when the number of divisions 19 is smaller than a threshold value, first tangential speed V1 may be smaller than tangential speed V2. Alternatively, when the number of divisions 19 is higher than the threshold value, tangential speed V1 may be higher than tangential speed V2.

In both embodiments, tangential speed V2 may be greater than speed V3.

Furthermore, labelling group 5 may comprise blowing means 30, which may be configured to blow an air flow F1 onto single cut labels 2 instantaneously travelling at station T.

Airflow F1 may be directed tangentially to path Q, R, towards transfer station and in the opposite direction of tangential speeds V1, V2.

Labelling group 5 may also comprise blowing means configured to blow an airflow F2 onto single cut labels 2 instantaneously travelling at station T.

Airflow F2 may be directed radially to paths Q, R and axes B, C and towards station T.

In particular, airflow F2 may be directed from cutter drum 11 to transfer drum 16.

Stationary cutter 26 may comprise:

a frame 40, which may extend in the zone between cutter drum 11 and transfer drum 16 and may be elongated substantially tangential to paths Q, R; and blade 13, which may extend substantially up to and as close as possible to transfer point T.

Blade 13 may comprise a cutting edge 42, which may extend transversally, orthogonally in the embodiment shown, with respect to axes B, C.

Cutting edge 42 may extend substantially up to and as close as possible to transfer point T.

Figure 9:
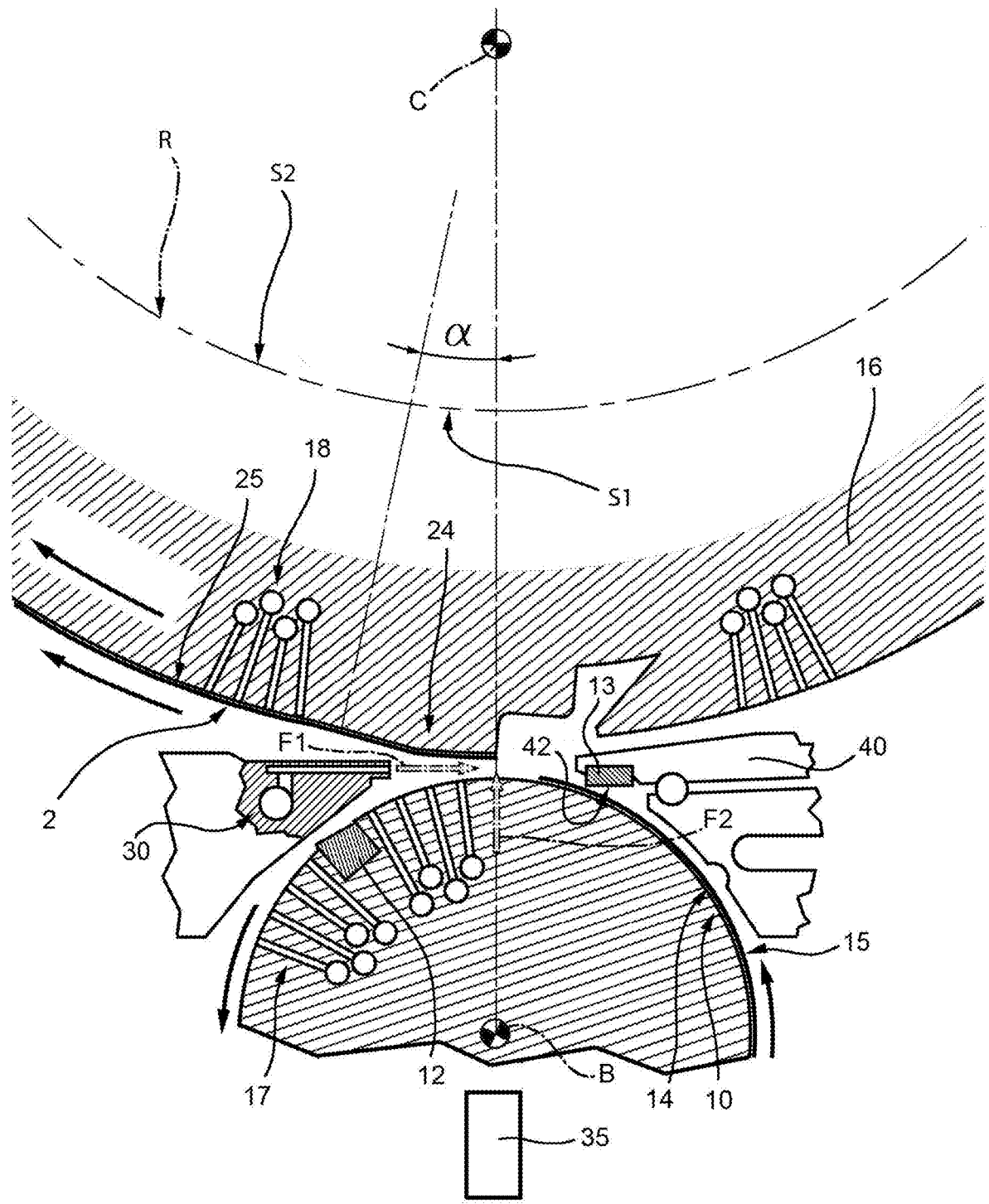

Vacuum system 18 may be controlled (as depicted in FIG. 9) in such a way that the suction action is inhibited along an arch-shaped portion S1 of path R starting at transfer station T and is exerted along an arch-shaped portion S2, which is arranged downstream of portion S1, proceeding according to the advancing direction of single cut labels 2 and transfer drum 16 along path Q.

Portion S1 may correspond to the arch starting at transfer station T and having an angular extension defined by angle α centred in axis C.

As a result, starting from the time at which each division 19 reaches transfer station T, the following may occur: The vacuum action may be inhibited at back pad 21 and in a portion of inter-pad segment 22 adjacent to back pad 21 for a certain time interval, and the vacuum action may then be exerted after the lapse of the time interval.

In use, carousel 4 may be fed with containers to be labelled at inlet station 7 and may rotate about axis A so as to convey containers 27 to be labelled along path P and up to output station 8.

In the following of the present description, reference is made to only one labelling group 5 and to only one cut label 2.

On the basis of the length of label 2 and/or rate of labelling machine 1, a given number of divisions 19 may be applied on transfer drum 16.

Transfer drum 16 may advance at tangential speed V2 at its outer periphery, and cutter drum 11 may advance at tangential speed V1 at its outer periphery. Tangential speed V1 may be chosen on the basis of the number of divisions 19 applied on cutter drum 11.

In detail, strip 10 may be unwound off reel 9 and fed along path Q by motorized roll 3 at speed V3.

Strip 10 may wind on cutter drum 11, be retained by the vacuum action on cutter drum 11, and advance along path Q.

The interaction between rotary blade 12 and stationary blade 13 may cut label 2 to the desired length in a position as close as possible to transfer station T.

Transfer drum 16 may rotate about axis C, receive cut label 2 and transfer it, due to the suction action, from cutting drum 11 to a gluing roll.

When label 2 has been cut, front portion 24 may rest on transfer drum 16 and rear portion 25 may rest on cutter drum 11. Thus, front portion 24 of label 2 may be accelerated from speed V3 to speed V2 and rear portion 25 of label 2 may be accelerated from speed V3 to speed V1, which may generate a tension or a compression in label 2.

Air flows F1, F2 may impinge on label 2 instantaneously travelling at station T, thus containing the risk that label 2 corrugates or stretches due to the sudden differential variation in speed.

The suction action on transfer drum 16 may be inhibited along portion S1 and may be exerted along portion S2. Thus, starting from the time at which each division 19 reaches transfer station T, the following may occur: The vacuum action may be inhibited at back pad 21 and in a portion of inter-pad segment 22 adjacent to back pad 21 for a certain time interval, and the vacuum action may then be exerted after the lapse of the time interval.

Transfer drum 16 may transfer single cut label 2 to gluing roll, downstream of which glued label 2 may be transferred to the affixing station 6, where it may be applied to a relative container 3.

Finally, carousel 4 may output labelled containers 27 at output station 8.

When it is necessary to change the number of divisions 19 of transfer drum 16, e.g. for varying the length of label 2 and/or the rate of labelling machine 1, tangential speed V1 may be correspondingly adjusted.

In general, the higher the required number of divisions 19, the higher the tangential speed V1.

Thus, "underspeed" transfer is generally carried out with low number of divisions 19 while the "overspeed" transfer is generally carried out with high number of divisions 19.

In some embodiments, then, tangential speed V1 may be different from tangential speed V2 and may be adjusted on the basis of the required number of divisions 19 of transfer drum 16.

In such embodiments, labelling group 5 does not carry out a homokinetic transfer of single cut labels 2 between cutter drum 11 and transfer drum 16.

It may therefore be possible to use the same cutter drum 11 having the same outer diameter with transfer drums 16 having different numbers of divisions 19.

Thus, it may be possible to convey labels 2 having different lengths and/or with particularly high speed in a very simple, fast and economic way.

Air flows F1, F2 may impinge on label 2 instantaneously travelling at station T, which may effectively contain the risk that cut labels 2 corrugate due to the differential acceleration between front portion 24 resting on transfer drum 16—and, therefore, acceleration from tangential speed V3 to tangential speed V2—and rear portion 25 resting on cutter drum 11—and, therefore, acceleration from tangential speed V3 to tangential speed V1.

The risk that cut labels 2 corrugate at transfer station T may also be substantially contained because the vacuum action may be inhibited along portion S1 of path Q, i.e. in a time interval immediately subsequent to the transfer of labels 2 to transfer drum 16.

Finally, it is apparent that modifications and variants not departing from the scope of protection of the claims may be made to labelling group 5 and to the method for applying labels 2 onto relative articles.

What is claimed is:

1. A labelling group for advancing a series of labels to be applied onto relative articles, comprising:
    a first drum adapted to convey a strip of labels along a first path and towards a transfer station;
    a cutting mechanism adapted to cut a sequence of single labels from the strip; and
    a second drum that is fed, in use, by the first drum with the cut single labels at the transfer station and adapted to convey simultaneously a required number of the cut single labels along a second path,
    wherein the first drum moves, in use, at a first tangential speed at the transfer station, the second drum moves, in use, at a second, tangential speed at the transfer station, and the first tangential speed is different from the second tangential speed and is adjusted, in use, based on the required number of the cut labels to be simultaneously conveyed on the second drum.

2. The labelling group of claim 1, further comprising:
    a first blower configured to blow a first air flow onto a label travelling at the transfer station,
    wherein the first air flow is directed tangentially to the first and second paths and at the transfer station.

3. The labelling group of claim 2, wherein the first blower is further configured to blow the first air flow in a direction opposite to the first tangential speed and the second tangential speed at the transfer station.

4. The labelling group of claim 1, further comprising:
    a second blower configured to blow a second air flow onto a cut label travelling at the transfer station,
    wherein the second air flow is directed radially to the first and second paths and at the transfer station.

5. The labelling group of claim 4, wherein the second blower is further configured to blow the second airflow from the first drum towards the second drum.

6. The labelling group of claim 1, wherein the cutting mechanism has a stationary blade and one rotary blade carried by the first drum, the stationary blade and the rotary blade cooperating with opposite sides of the labels to cut them from the strip, and the stationary blade extending between the first and second drums along a direction transversal to the first and second paths and substantially at the transfer point.

7. The labelling group of claim 1, wherein the second drum has a vacuum configured to exert a suction action on the cut labels to retain them on the second drum, the suction action being inhibited along a first portion of the second path starting from the transfer station and being exerted along a second portion of the second path, the second portion being arranged downstream of the first portion along the second path according to an advancing direction of the second drum.

8. The labelling group of claim 1, wherein the first tangential speed is greater than the second tangential speed.

9. The labelling group of claim 1, wherein the first tangential speed is less than the second tangential speed.

10. A labelling machine, comprising:
    a conveyor for conveying a plurality of articles; and
    a labelling group including:
        a first drum adapted to convey a strip of labels along a first path and towards a transfer station,
        a cutting mechanism adapted to cut a sequence of single labels from the strip, and,
        a second drum that is fed, in use, by the first drum with the cut single labels at the transfer station and adapted to convey simultaneously a required number of the cut single labels along a second path, and
        a gluing element, which applies, in use, glue onto the cut label and is fed, in use, with the label by the second drum,
    wherein the first drum moves, in use, at a first tangential speed at the transfer station, the second drum moves, in use, at a second tangential speed at the transfer station, and the first tangential speed is different from the second tangential speed and is adjusted, in use, based on the required number of the cut labels to be simultaneously conveyed on the second drum.

11. A method for applying a plurality of labels to respective articles, comprising:
    conveying a strip of labels along a first path with a first drum;
    cutting the strip to form a sequence of single cut labels as the strip is advanced along the first path;
    receiving the single cut labels with a second drum at a transfer station;
    simultaneously conveying t required number of the single cut labels with the second drum along a second path;
    selecting the required number of the single cut labels to be simultaneously conveyed on the second drum;
    advancing the first drum with a first tangential speed at the transfer station; and
    advancing the second drum with a second tangential speed at the transfer station, the first tangential speed being different from the second tangential speed and being adjusted based on the required number of the single labels to be simultaneously conveyed.

12. The method of claim 11, further comprising blowing a first air flow tangential to the first and second paths kit the transfer station.

13. The method of claim 12, wherein blowing the first air flow further comprises blowing the first air flow M a direction opposite to the first and second tangential speeds at the transfer station.

14. The method, of claim 12, further comprising blowing a second air flow radially to the first and second paths at the transfer station.

15. The method of claim 11, further comprising exerting a suction action on the cut single labels to retain them on the second drum.

16. The method of claim 15, wherein exciting the suction action further comprises:
    inhibiting the suction action along a first portion of the second path starting from the transfer station; and
    exerting the suction action along a second portion of the second path, the second portion being arranged downstream of the first portion proceeding along the second path according to an advancing direction of the second drum.

17. The method of claim 11, wherein the first tangential speed is greater than the second tangential speed.

18. The method of claim 11, wherein the first tangential speed is less than the second tangential speed.

\* \* \* \* \*